United States Patent
Hoskin et al.

(10) Patent No.: US 10,220,461 B2
(45) Date of Patent: Mar. 5, 2019

(54) HOLE DRILLING ELASTICALLY DEFORMED SUPERALLOY TURBINE BLADE

(71) Applicant: General Electric Company, Schenectady, NY (US)

(72) Inventors: Robert Frank Hoskin, Lawrenceville, GA (US); Robert Aldo Del Freo, Dingmans Ferry, PA (US); Joseph William Janssen, Lambertville, NJ (US); Joseph Leonard Moroso, Greenville, SC (US); Eric Alan Overholt, Bath, PA (US); Matthew Ian Van Biervliet, Parsippany, NJ (US); Joseph Anthony Weber, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 139 days.

(21) Appl. No.: 15/485,505

(22) Filed: Apr. 12, 2017

(65) Prior Publication Data

US 2018/0297136 A1    Oct. 18, 2018

(51) Int. Cl.
| | |
|---|---|
| *B23H 3/00* | (2006.01) |
| *B23H 9/14* | (2006.01) |
| *B23H 9/10* | (2006.01) |
| *B23H 11/00* | (2006.01) |
| *B23H 9/16* | (2006.01) |

(Continued)

(52) U.S. Cl.
CPC .............. *B23H 9/16* (2013.01); *B23B 41/14* (2013.01); *B23H 3/00* (2013.01); *B23H 9/10* (2013.01); *B23H 11/003* (2013.01); *B23Q 3/063* (2013.01); *B23Q 3/065* (2013.01); *F01D 5/286* (2013.01);
(Continued)

(58) Field of Classification Search
None
See application file for complete search history.

(56) References Cited

U.S. PATENT DOCUMENTS

| 3,995,134 A | 11/1976 | Dudden |
| 4,193,775 A | 3/1980 | Wang |

(Continued)

OTHER PUBLICATIONS

S.T.E.M. (Shaped Tube Electrolytic Machining): STEM—Small holes, big challenge, ELE Advanced Technologies Ltd, n.d., n.p., accessed Apr. 6, 2017, 2 pages. <http://eleat.co.uk/services/stem/>.

(Continued)

*Primary Examiner* — Brian W Cohen
(74) *Attorney, Agent, or Firm* — Ernest G. Cusick; Hoffman Warnick LLC

(57) ABSTRACT

A method includes applying a force to elastically deform at least a portion of a superalloy turbine blade from a relaxed, initial position to an elastically deformed position. The at least a portion of the superalloy turbine blade has a curvature in the elastically deformed position not present in the relaxed, initial position. A hole is drilled generally span-wise through the at least a portion of the superalloy turbine blade in the elastically deformed position, and when the force is released, the superalloy turbine blade returns to the relaxed, initial position and the hole takes on a hole curvature within the at least a portion of the superalloy turbine blade.

20 Claims, 14 Drawing Sheets

(51) Int. Cl.
*B23Q 3/06* (2006.01)
*F01D 5/28* (2006.01)
*B23B 41/14* (2006.01)

(52) U.S. Cl.
CPC ...... *B23B 2215/76* (2013.01); *F05D 2230/10* (2013.01); *F05D 2300/175* (2013.01)

(56) References Cited

U.S. PATENT DOCUMENTS

| | | | |
|---|---|---|---|
| 4,197,443 | A | 4/1980 | Sidenstick |
| 4,650,949 | A | 3/1987 | Field |
| 4,769,118 | A | 9/1988 | Johns |
| 5,306,401 | A | 4/1994 | Fierkens et al. |
| 5,395,188 | A | 3/1995 | Bailey et al. |
| 5,637,239 | A | 6/1997 | Adamski et al. |
| 5,669,991 | A | 9/1997 | DeFilippo |
| 5,820,744 | A | 10/1998 | Edwards et al. |
| 5,868,194 | A | 2/1999 | Horwood |
| 6,387,242 | B1 | 5/2002 | Wei et al. |
| 6,644,920 | B2 | 11/2003 | Beeck et al. |
| 7,220,934 | B2 | 5/2007 | Paauwe et al. |
| 7,654,095 | B2 | 2/2010 | Sullivan |
| 7,726,135 | B2 | 6/2010 | Sullivan |
| 7,922,451 | B1 | 4/2011 | Liang |
| 7,964,817 | B2 | 6/2011 | MacGregor |
| 7,997,865 | B1 | 8/2011 | Liang |
| 8,043,058 | B1 | 10/2011 | Liang |
| 8,066,485 | B1 | 11/2011 | Liang |
| 8,535,491 | B2 | 9/2013 | Wei et al. |
| 8,864,465 | B2 | 10/2014 | Viegas et al. |
| 9,062,561 | B2 | 6/2015 | Tibbott |
| 9,145,773 | B2 | 9/2015 | Bergholz, Jr. et al. |
| 9,200,523 | B2 | 12/2015 | Crites et al. |
| 2008/0283504 | A1 | 11/2008 | MacGregor |
| 2010/0316502 | A1 | 12/2010 | Khanhson et al. |
| 2011/0027097 | A1* | 2/2011 | Bertrand ............... B21K 3/04 416/232 |

OTHER PUBLICATIONS

STEM drill controllers and power supplies, ACC Systems Ltd, n.d, n.p, accessed Apr. 6, 2017, 2 pages. <http://www.accsystems.co.uk/stem_drill.htm>.

\* cited by examiner

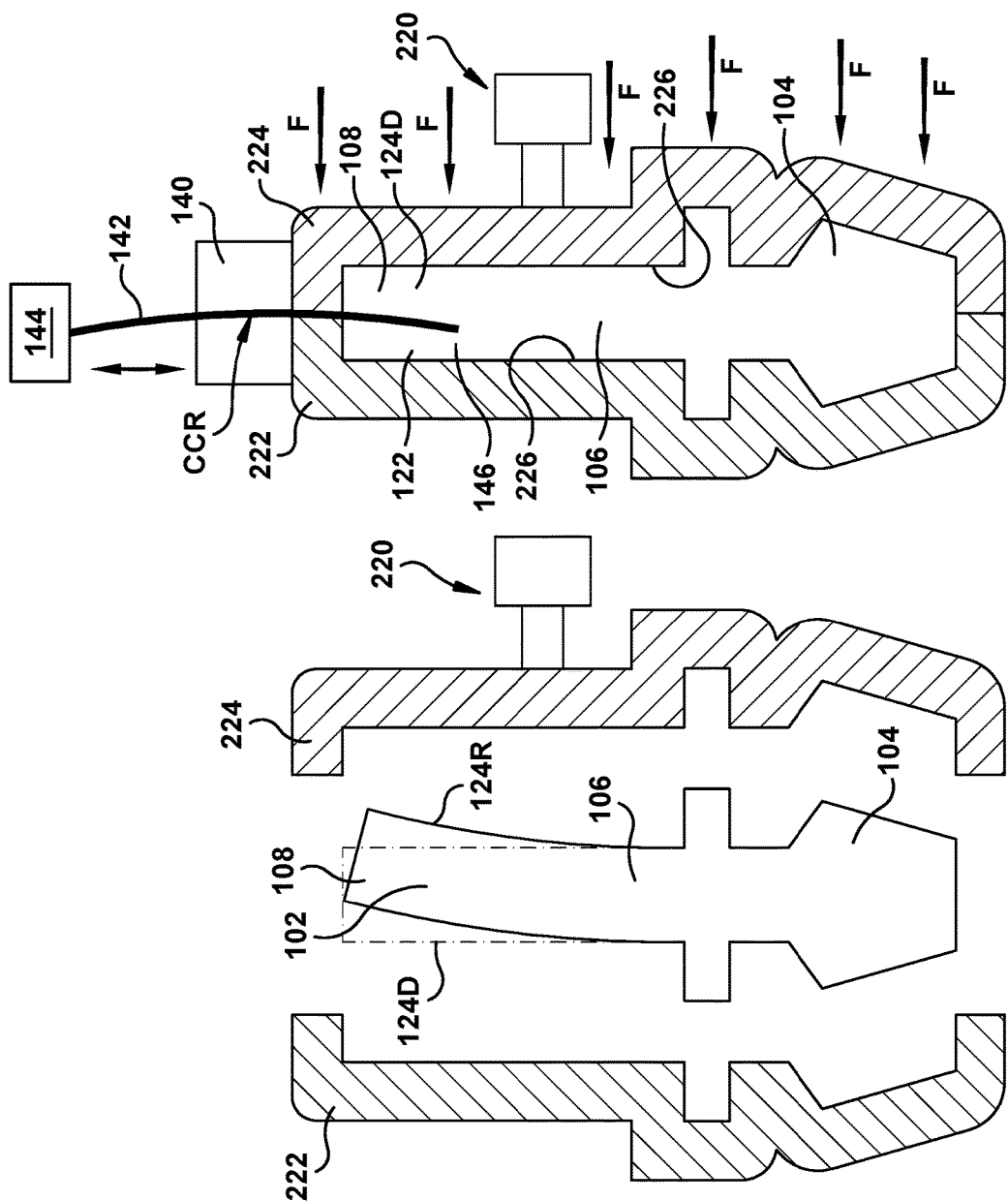

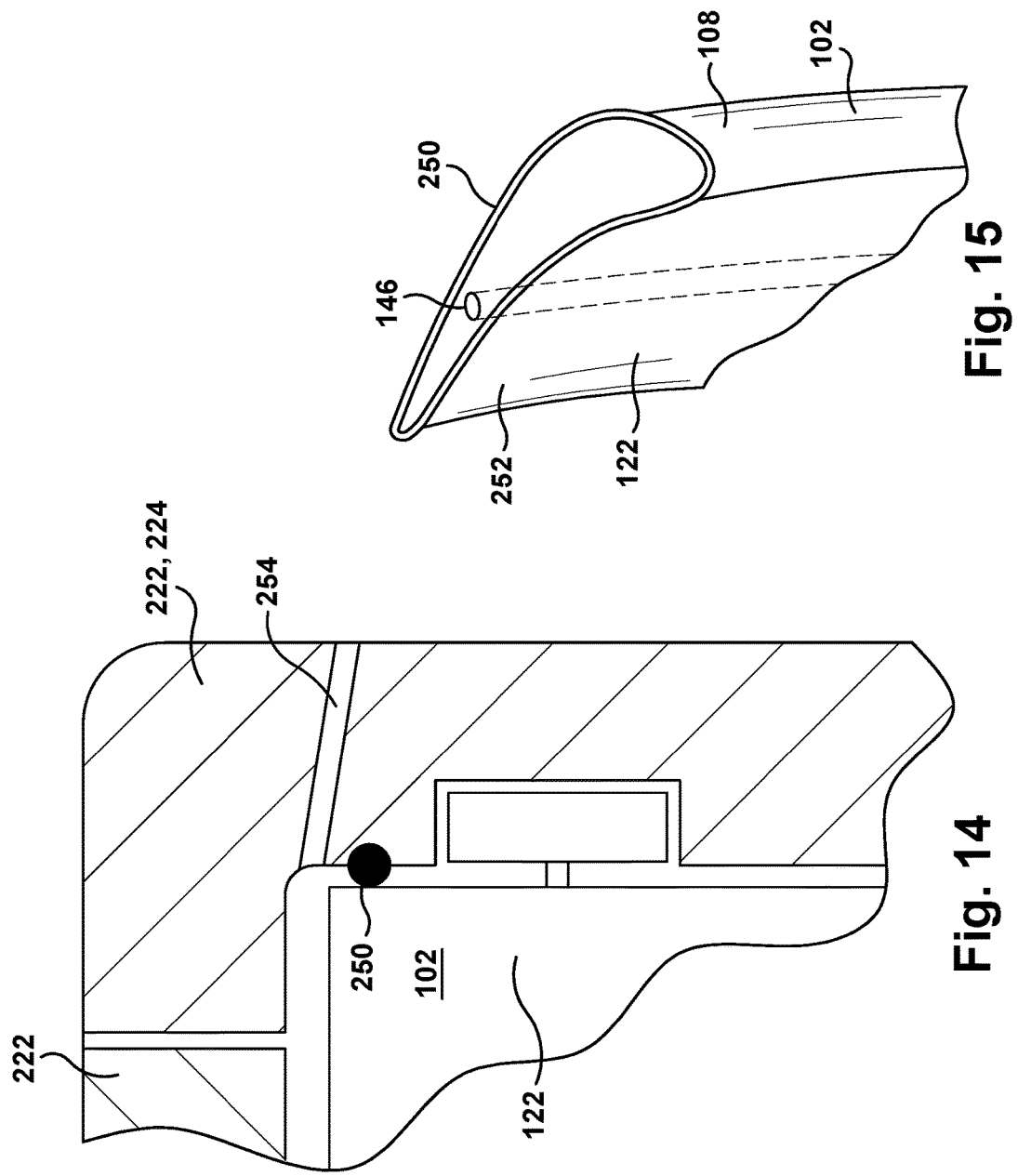

HOLE DRILLING ELASTICALLY DEFORMED SUPERALLOY TURBINE BLADE

CROSS-REFERENCE TO RELATED APPLICATIONS

This application relates to co-pending U.S. patent application Ser. No. 15/485,536, filed concurrently herewith, and currently pending.

BACKGROUND OF THE INVENTION

The disclosure relates generally to turbine blade machining, and more particularly, to a method and fixture for hole drilling an elastically deformed superalloy turbine blade.

Large turbine blades for power generation turbines can include turbine blades more than one meter in length that are very thin relative to their span and chord, particularly near the trailing edge in radially outer span locations. Such turbine blades can also have curvature in the span-wise and chord-wise directions. Due to the high operating temperatures, turbine blades typically include a number of cooling passages extending therethrough, which are provided, among other reasons, to extend the creep life of the blades. Creep is effectively the long term accumulation of plastic strain that eventually leads to rupture. However, the turbine blade thinness and curvature can make it difficult to fabricate cooling passages or holes within the airfoil of the blade, including span-wise cooling passages that follow the curvature of the airfoil. Methods to fabricate long cooling passages with variable curvature, particularly accurately-placed long variable-curvature passages formed using widely employed shaped tube electrolytic machining (STEM) drilling, have not been developed.

One approach to produce curvilinear holes is to flatten the airfoil of the blade in the region where the hole is required, drill a straight hole and then bend the drilled region into the required curve. This process thus requires plastic deformation and reformation of the airfoil. Advances in turbomachinery technology however have led to the use of more advanced materials such as superalloys like high gamma prime superalloys, which cannot be deformed in this manner. In particular, plastically deforming superalloys, i.e., bending the material such that it does not automatically return to its original state, induces plastic strain and dislocations in the material that are not repaired when the superalloy is bent back into its original position. Conventional materials can be exposed to a high temperature thermal process in order to negate the impact of the strain and dislocations on the creep life. However, with superalloys exposed to a high plastic strain, the high temperature thermal process may generate recrystallized grains, weakening the material. Any manufacturing process that induces plastic strain into a turbine blade will effectively give the creep a head start and reduce the overall life of the blade. Consequently, this approach is inapplicable to current turbine blades that are made of superalloys.

BRIEF DESCRIPTION OF THE INVENTION

A first aspect of the disclosure provides a method including: applying a force to elastically deform at least a portion of a superalloy turbine blade from a relaxed, initial position to an elastically deformed position, the at least a portion of the superalloy turbine blade having a curvature in the elastically deformed position not present in the relaxed, initial position; drilling a hole generally span-wise through the at least a portion of the superalloy turbine blade in the elastically deformed position; and releasing the force, allowing the superalloy turbine blade to return to the relaxed, initial position and the hole to take on a hole curvature within the at least a portion of the superalloy turbine blade.

A second aspect of the disclosure provides a method including: coupling a protective member to a first portion of a superalloy turbine blade; applying a force to the protective member to elastically deform at least a second portion of a superalloy turbine blade from a relaxed, initial position to an elastically deformed position, the at least a second portion of the superalloy turbine blade having a curvature in the elastically deformed position not present in the relaxed, initial position; drilling a hole, using shaped tube electrolytic machining (STEM), generally span-wise through the at least a second portion of the superalloy turbine blade in the elastically deformed position; and releasing the force, allowing the superalloy turbine blade to return to the relaxed, initial position and the hole to take on a hole curvature within the at least a portion of the superalloy turbine blade.

A third aspect of the disclosure provides a fixture for drilling a hole in a superalloy turbine blade, the fixture including: a mount to selectively hold a root of the superalloy turbine blade, the superalloy turbine blade extending from the mount; an actuator to apply a force to elastically deform at least a portion of the superalloy turbine blade when held by the mount from a relaxed, initial position to an elastically deformed position, the at least a portion of the superalloy turbine blade having a curvature in the elastically deformed position not present in the relaxed, initial position; and a drill guide configured to guide a drilling element into the superalloy turbine blade in the elastically deformed position.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which:

FIGS. 8 and 9 show side views of a pair of clamping members of the fixture of FIG. 7 in an open and a closed position, respectively, according to an embodiment of the disclosure.

FIG. 14 shows a partial cross-sectional view of a seal for the pair of clamping members of the fixture of FIG. 7 according to an embodiment of the disclosure.

FIG. 15 shows a schematic perspective view of the seal of FIG. 14 about a superalloy turbine blade according to an embodiment of the disclosure.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

Figure 1:
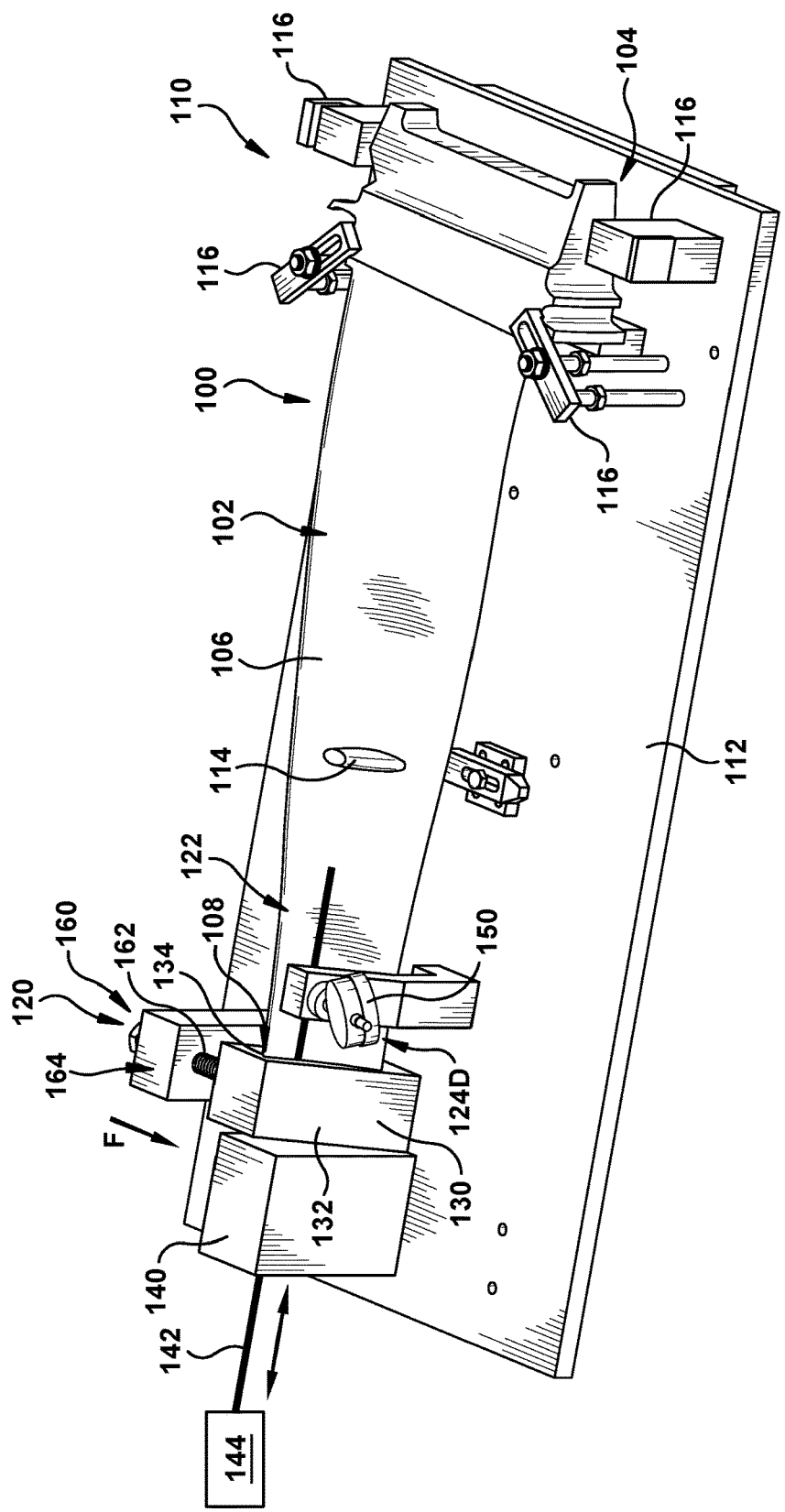
FIG. 1 shows a perspective view of a fixture for holding a superalloy turbine blade in elastic deformation for hole drilling according to embodiments of the disclosure.

As an initial matter, in order to clearly describe the current disclosure it will become necessary to select certain terminology when referring to and describing relevant machine components within a turbomachine or relevant to a turbine blade thereof. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through the turbine engine or, for example, the flow of air through the combustor or coolant through one of the turbine's component systems. The term "downstream" corresponds to the direction of flow of the fluid, and the term "upstream" refers to the direction opposite to the flow. The terms "forward" and "aft," without any further specificity, refer to directions, with "forward" referring to the front or compressor end of the engine, and "aft" referring to the rearward or turbine end of the engine. With regard to turbine blades, the terms "leading" and "trailing" without any further specificity, refer to directions, with "leading" referring to the front, upstream edge of the blade, and "trailing" referring to the rearward, downstream edge of the blade. It is often required to describe parts that are at differing radial positions with regard to a center axis. The term "radial" refers to movement or position perpendicular to an axis. In cases such as this, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. The term "axial" refers to movement or position parallel to an axis. Further, the term "circumferential" refers to movement or position around an axis. It will be appreciated that such terms may be applied in relation to the center axis of the turbine. "Generally span-wise" relates to a direction of drilling relative to a superalloy turbine blade and means mainly through a length of, or mainly longitudinally through, the superalloy turbine blade, perhaps with some radius of curvature in the drilling and perhaps with some offset from an axis of the blade.

As indicated above, the disclosure provides a method and fixture to form cooling passages in a large, superalloy turbine blade, and in particular, an airfoil thereof. The cooling passage may be formed as a hole having long variable-curvature in large, superalloy turbine blades. In the present disclosure, at least a portion of turbine blade is elastically deformed using various types of fixtures followed by drilling of a hole therein to form long cooling passages. Here, the superalloy turbine blades are not permanently or plastically deformed. The elastic deformations allows drilling of a straight or linear hole and/or holes of constant curvature using STEM drilling using known methods. Once the force causing the elastic deformation is removed, the superalloy turbine blade returns to its manufactured state, and the hole in the blade creating the cooling passage has a hole curvature that can be constant or can vary over its length. The methodology enables installation of cooling passages in superalloy turbine blades to enhance their creep life without creating any plastic strain.

Referring to the perspective view of FIG. 1, a fixture 100 for drilling a hole in a superalloy turbine blade 102 according to one embodiment of the disclosure is illustrated. Superalloy turbine blade 102 may include any now known or later developed form of turbine blade. As noted, teachings of the disclosure are especially applicable to turbine blades 102 having relatively long lengths, e.g., approximately 1 meter, but may be applied to any length turbine blade. Superalloy turbine blade 102 may general include: a root 104 including any now known or later developed structure for mounting turbine blade 102 in a rotor wheel (not shown) of a turbomachine, an airfoil 106 and a tip end 108. Tip end 108 may include a tip shroud or cover (not shown). Superalloy turbine blade 102 may also include a mid-span shroud 114, but this is not necessary in all instances. As used herein, "superalloy" refers to a metal alloy having numerous excellent physical characteristics compared to conventional alloys, such as but not limited to a tensile elongation range (based on 2 inch gauge length) of 4% to 15%. Example superalloys may include but are not limited to: nickel or cobalt based superalloys. It is noted that not all of superalloy turbine blade 102 need be superalloy, but only the portion upon which teachings of the disclosure will be applied.

Continuing with FIG. 1, fixture 100 includes a mount 110 to selectively hold root 104 of superalloy turbine blade 102. Superalloy turbine blade 102 extends from mount 110, e.g., in a cantilevered fashion. In one embodiment, mount 110 may be held in position by a base 112 upon which other parts of fixture 100 may also be mounted. Base 112 may include any form of foundational element, e.g., a metal plate, a stand, a floor, a table, etc., capable of positioning parts of fixture 100 and to apply forces, as described herein, to superalloy turbine blade 102. It is understood, however, that mount 110 and other parts of fixture 100 may be separately positioned relative to one another, e.g., using separate floor foundations. In one embodiment, mount 110 may include a plurality of clamps 116 to hold root 104 to base 112. Clamps 116 may include any form of adjustable clamp, e.g., threaded bolts with holding elements, etc. Alternatively, mount 110 may include any variety of systems to hold superalloy turbine blade 102, e.g., a dovetail slot 118 (FIG. 3) similar to that in a rotor wheel (not shown) in which a dovetail of root 104 would be mounted.

Figure 2:
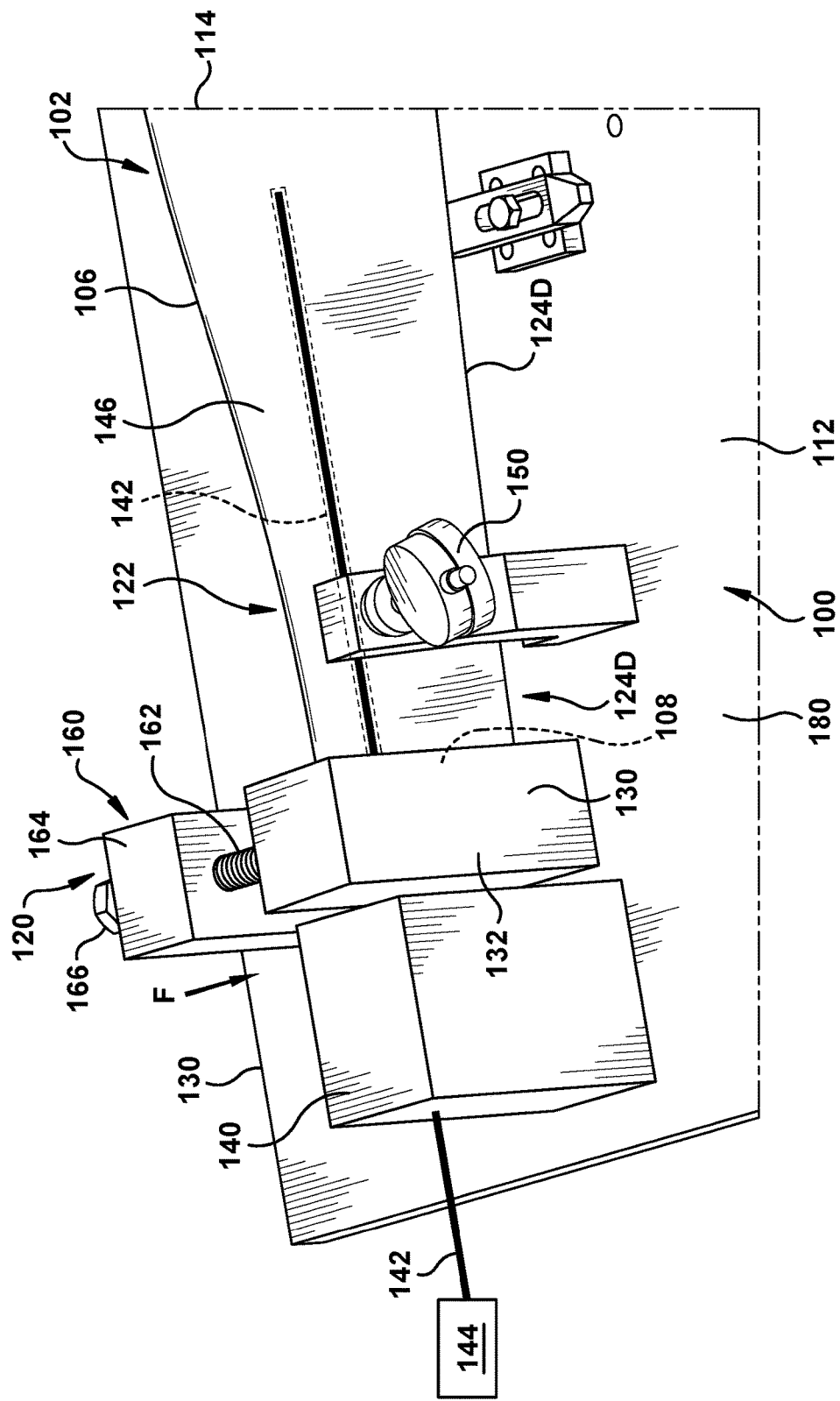
FIG. 2 shows an enlarged perspective view of one end of the fixture of FIG. 1.
Figure 3:
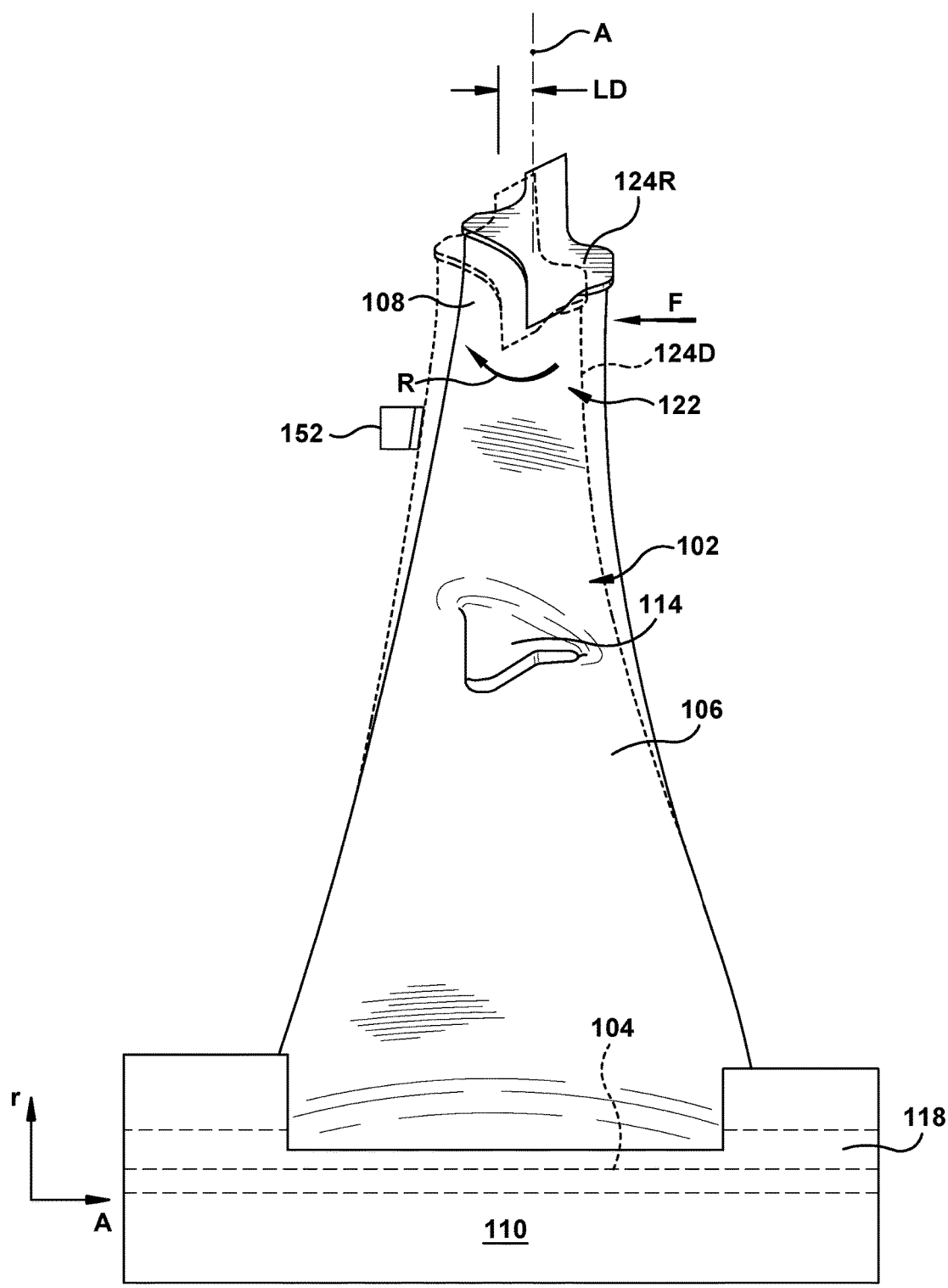
FIG. 3 shows a side view of a superalloy turbine blade including elastic deformation thereof according to embodiments of the disclosure.

As shown in FIG. 1 and the enlarged perspective view of FIG. 2, fixture 100 may also include an actuator 120 to apply a force F to elastically deform at least a portion of the superalloy turbine blade 102 when held by mount 110. As shown in the schematic plan view of FIG. 3, force F forces at least a portion 122 of superalloy turbine blade 102 from a relaxed, initial position 124R to an elastically deformed position 124D (in phantom). It is noted that in the relaxed, initial position, superalloy turbine blade 102 may include curved surfaces or span, such features being its as-built shape. The extent of portion 122 may depend on, for example, the blade, the actuator use, the amount of force F and where/how force F is applied. According to embodiments of the disclosure, force F may be substantially similar to a force applied to superalloy turbine blade 102 during operation of the blade in a turbomachine. That is, force F is sufficient to elastically deform the blade (i.e., temporarily deflect it from relaxed, initial position 124R) but not permanently bend or permanently deform the blade. Hence, in the elastically deformed position, superalloy turbine blade is not permanently or plastically misshapen or deformed. Further, it will return to relaxed, initial position 124R upon release of force F. As shown in FIG. 3, portion(s) 122 of superalloy turbine blade 102 has a curvature in elastically deformed position 124D not present in relaxed, initial position 124R. Further, as shown in FIG. 3, elastically deformed position 124D may include a lateral deformation LD perpendicular to a longitudinal axis A of superalloy turbine blade 102, and/or a twist R about longitudinal axis A of superalloy turbine blade 102. Whether lateral deformation LD and/or rotation R is present in elastically deformed position 124D will vary on superalloy turbine blade 102 shape, size, etc., and how force F is applied (described herein). The force F applicable to each blade to achieve the desired hole curvature will depend on a number of factors such as but not limited to: the superalloy used, the length of the blade, the location of the application of force F, the distribution of force F, and the configuration of portion 122 in which the hole is desired. As used herein, "hole curvature" may include planar curvature, or non-planar or helical curvature depending on how force F is applied. The amount of curvature in the blade in elastically deformed position 124D can be calculated based on the aforementioned force factors and the amount of hole curvature desired in a cooling passage hole to be created in, for example, airfoil 106. In the example shown in FIGS. 1-2, portion 122 includes a length of superalloy turbine blade 102 extending radially inward from its tip end 108, but not an area in airfoil 106 radially outward from root 104. However, portion 122 can be altered depending on the desired hole curvature.

As shown in FIGS. 1 and 2, fixture 100 may optionally include a protective member 130 for coupling to a location on portion 122 of superalloy turbine blade 102 at which actuator 120 engages superalloy turbine blade 102. In FIGS. 1 and 2, protective member 130 includes a block 132 having an opening 134 therein configured to seat on tip end 108 of superalloy turbine blade 102, e.g., a shroud thereof. Block 132 preferably mates with tip end 108 to protect tip end 108 and allow transfer of force F to superalloy turbine blade 102 without damage. Protective member 130 may include any material capable of withstanding force F, protecting superalloy turbine blade 102 and withstanding any drilling-related electrolyte, e.g., a strong metal alloy, carbon, ceramic, steel or steel alloy. Protective member 130 may not be necessary in all instances.

Fixture 100 also may include a drill guide 140 configured to guide a drilling element 142 into superalloy turbine blade 102 in elastically deformed position 124D. In one embodiment, drill guide 140 is configured to guide drilling element 142 of a shaped tube electrolytic machining (STEM) system 144 to form a hole 146 (FIG. 2). STEM system 144 may include any now known or later developed system employing an acid electrolytic drilling technique, e.g., for making long precision holes in corrosion resistant superalloys. As understood in the field, STEM system 144 provides one or more tubular drilling elements through which an electrolyte is passed into the blade. A high current is passed between the conductive blade and the drilling element which acts as an electrode. As the electrolyte passes through the drilling element, a hole shaped like a cross-section of the drilling element is drilled into superalloy turbine blade 102, and material is removed by the electrolyte. Drilling element 142 may be straight, i.e., along a linear path, or curved. In the latter case, STEM system 144 may drill at a constant radius curvature into the blade.

Fixture 100 may also include a mechanism to identify whether superalloy turbine blade 102 is in the desired, elastically deformed position 124D. In one embodiment, shown in FIGS. 1 and 2, a sensor 150 may be provided that is configured to identify that superalloy turbine blade 102 is in elastically deformed position 124D. Sensor 150 may include any form of electronic sensor capable of positional triggering, e.g., a touch sensor, laser sensor, button sensor, etc. Sensor 150 may indicate proper positioning in any known fashion, e.g., visible or audible indicator, or an electric signal to a control system of, for example, STEM system 144, or actuator 120, etc. In operation, superalloy turbine blade 102 would be elastically deformed using actuator 120 until sensor 150 indicated it was in elastically deformed position 124D. In alternative embodiment, shown in FIG. 3, rather than sensor 150, a positioning element 152 configured to locate superalloy turbine blade 102 in elastically deformed position 124D may be employed. Positioning element 152 may be any form of fixed or adjustable stop mounted in a controlled fashion relative to mount 110, e.g., on base 112. In one embodiment, actuator 120 may apply force F to elastically deform superalloy turbine blade 102 until portion 122 reaches a predetermined distance, e.g., 1 millimeter, from positioning element 152, which indicates portion 122 is in elastically deformed position 124D. The predetermined distance can be any distance readily measurable by a user, and can be measured in any known fashion, e.g., ruler, calipers, electronically, etc.

Figure 4:
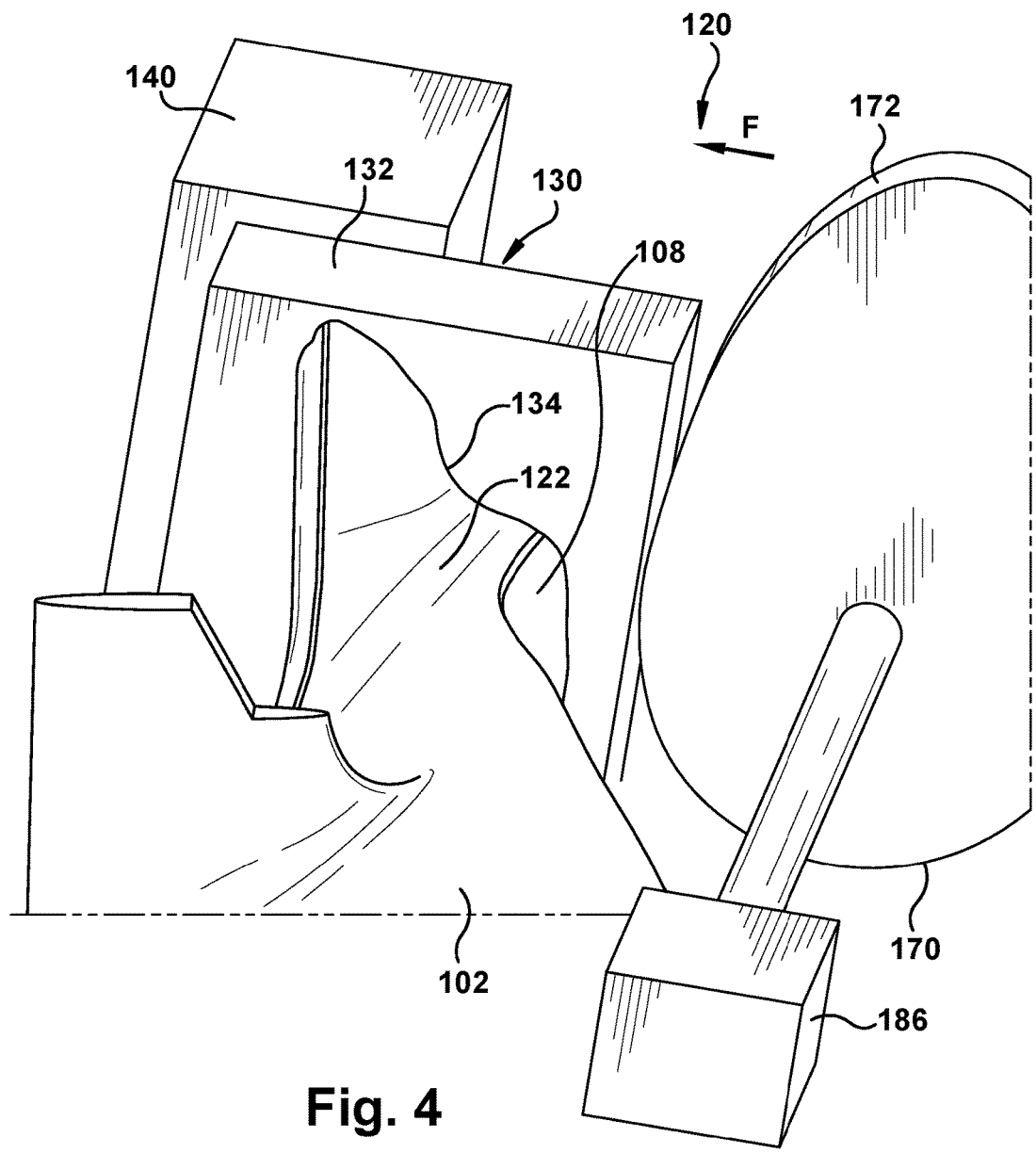
FIG. 4 shows a perspective view of an actuator for a fixture according to one embodiment of the disclosure.
Figure 5:
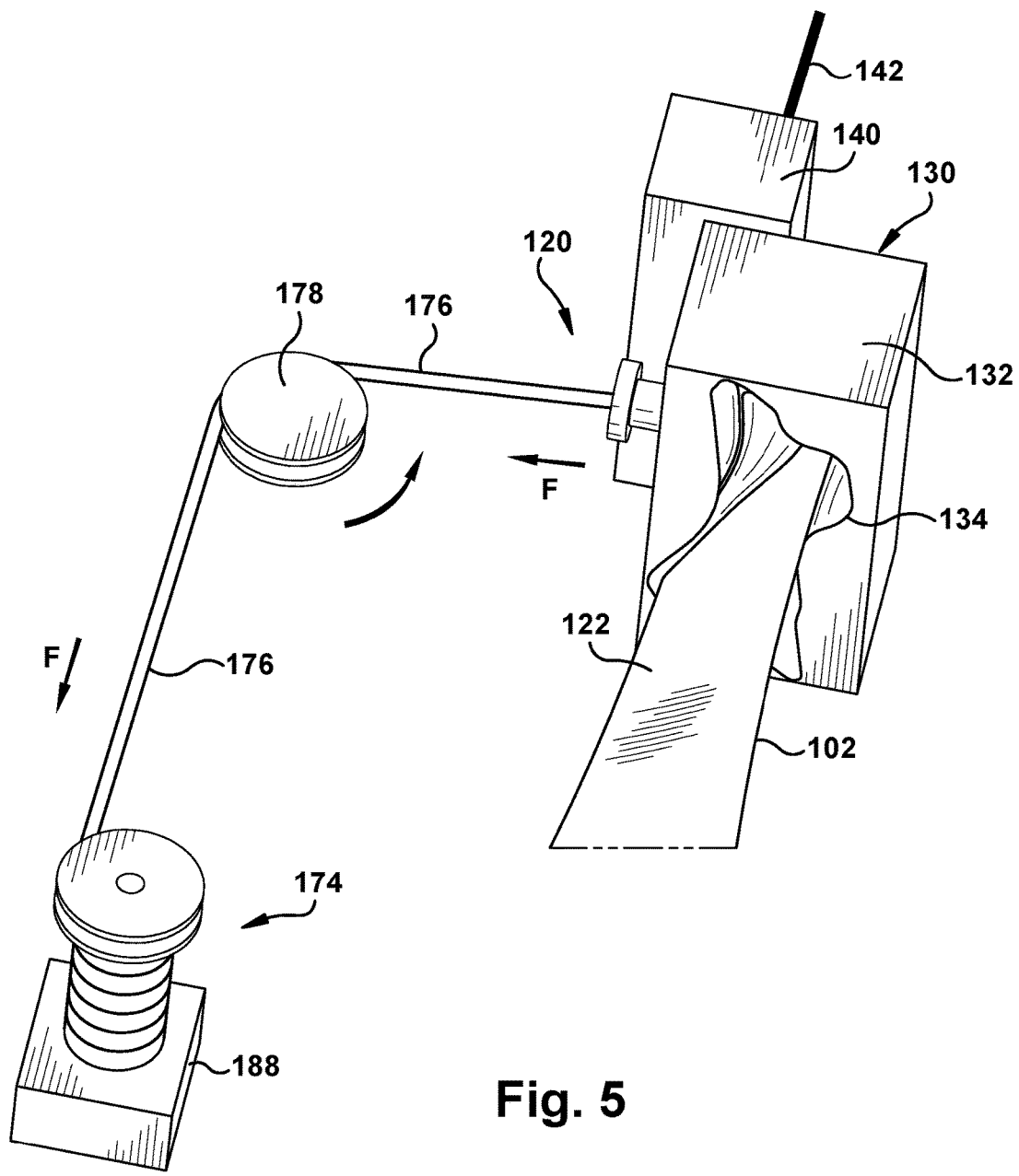
FIG. 5 shows a perspective view of an actuator for a fixture according to another embodiment of the disclosure.
Figure 6:
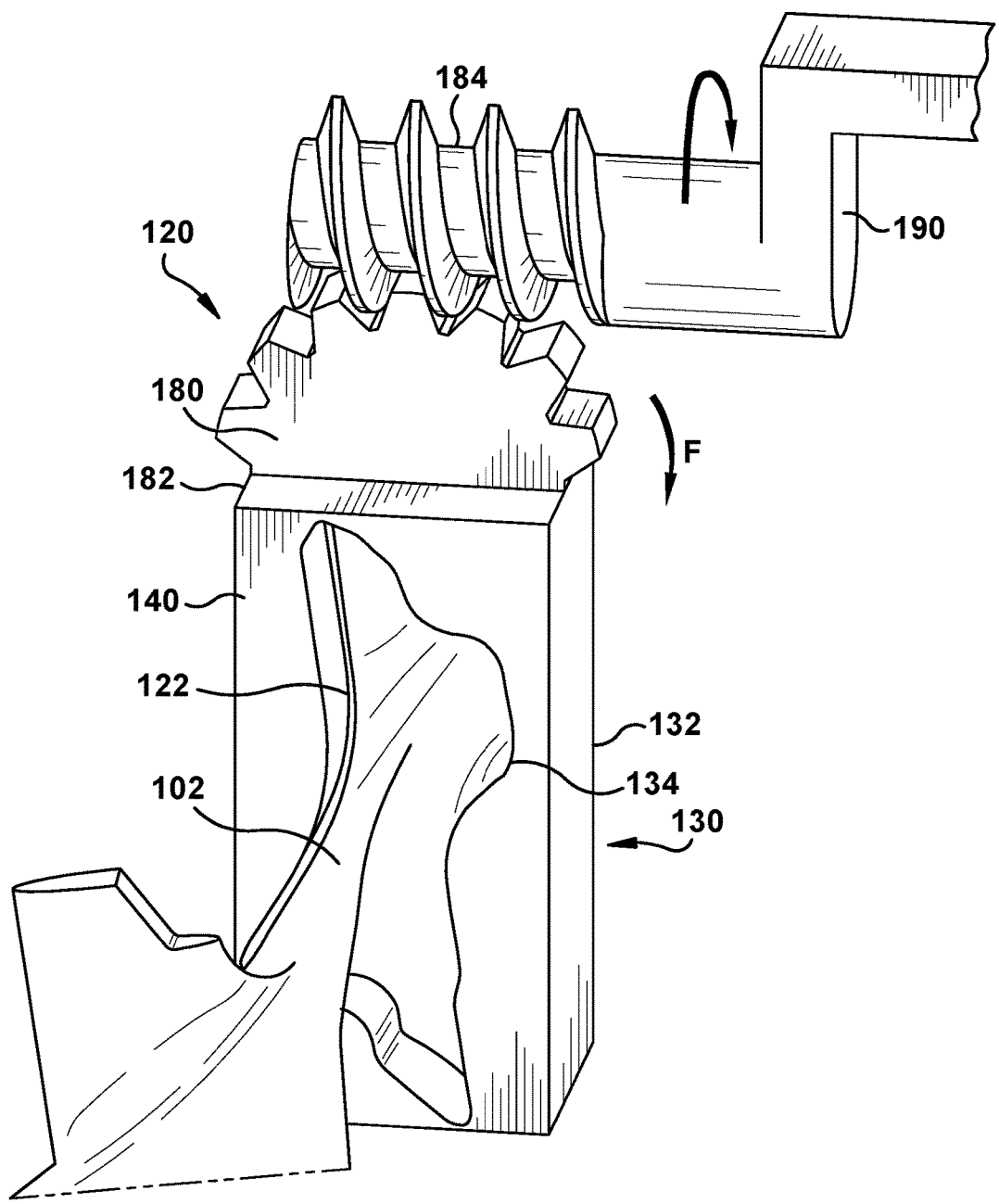
FIG. 6 shows a perspective view of an actuator for a fixture according to yet another embodiment of the disclosure.

With continuing reference to FIGS. 1 and 2, and also FIGS. 4-6, actuator 120 can take a variety of forms within the scope of the disclosure. In FIGS. 1 and 2, actuator 120 includes a jack screw 160 including a selectively rotatable screw 162, e.g., a bolt, configured to engage at least portion 122 of superalloy turbine blade 102. Jack screw 160 may include any form of fixed coupling, e.g., to base 112 via a support 164. Screw 162 may be rotatably adjusted and therefore length adjusted relative to support 164 to apply force F to superalloy turbine blade 102. Referring to the perspective view of FIG. 4, in another embodiment, actuator 120 may include a selectively rotatable, eccentric cam 170 including a surface 172 configured to apply force F to at least portion 122 of superalloy turbine blade 102. In another embodiment, shown in the perspective view of FIG. 5, actuator 120 may include a selectively rotatable winch 174 including a flexible cord 176 coupled to protective member 130 to apply force F. Flexible cord 176 may take any form capable of withstanding the tensile forces applied thereto, e.g., a metal cable, chain, etc. Any pulley(s) 178 required to direct flexible cord 176 may be employed. Selectively rotatable winch 174 and/or pulley(s) 178 may be coupled to base 112 (not shown) in any manner. Referring to the perspective view shown in FIG. 6, in another embodiment, protective member 130 may include a first gear 180 on an exterior surface 182 thereof, and actuator 120 may include a selectively rotatable second gear 184 configured to mesh with first gear 180 to apply force F to portion 122 of superalloy turbine blade 102. In this case, force F is a rotational force that will rotate portion 122 of the blade, creating twist R (FIG. 3).

In each of the embodiments of FIGS. 1, 2 and 4-6, the rotation of the selectively rotatable component of actuator 120 that causes application of force F can be provided in a number of ways. For example, in FIGS. 1 and 2, screw 162 includes a bolt head 166 for turning by a conventional wrench (not shown) or wrench driver. In FIG. 4, a motor 186 may be coupled to selectively rotatable, eccentric cam 170 to rotate the cam and apply force F to at least portion 122. In FIG. 5, a motor 188 may be coupled to selectively rotate winch 174. In FIG. 6, a handle 190 is coupled to rotatable second gear 184 to selectively rotate the second gear and apply force F to at least portion 122. Any of the above-described techniques for selectively rotating the requisite part of actuator 120 may be applied in any embodiment. With further reference to the FIGS. 1, 2, 4 and 5 embodiments, in each embodiment, actuator 120 is shown applying force F to a protective member 130. It is emphasized, however, that protective member 130 may not be necessary in all instances and the force F may be applied directly to portion 122.

Figure 7:
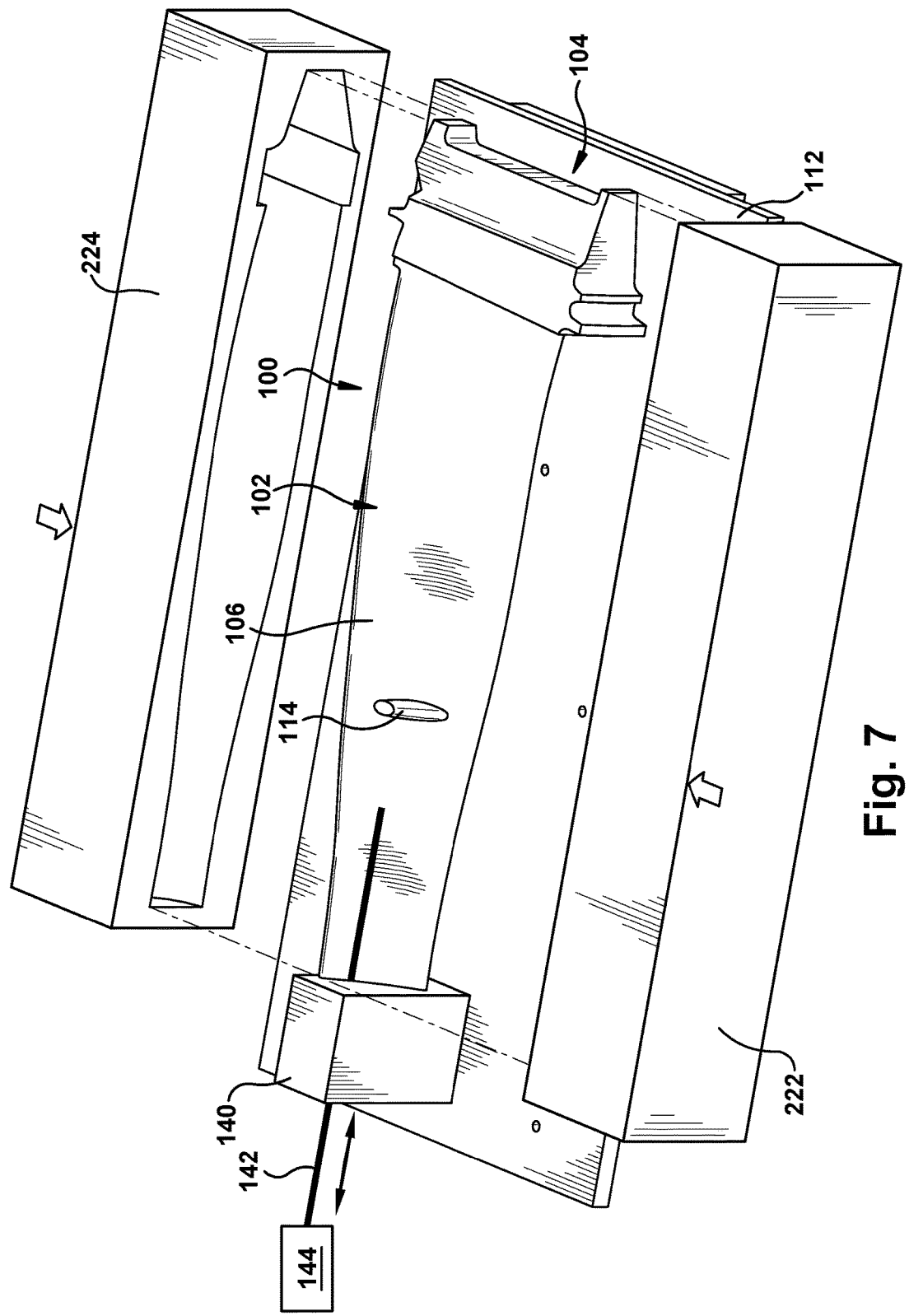
FIG. 7 shows a perspective view of a fixture for holding a superalloy turbine blade in elastic deformation for hole drilling according to further embodiments of the disclosure.

Referring to FIGS. 7-15, in another embodiment, fixture 100 may include a pair of clamping members 222, 224 configured to engage superalloy turbine blade 102. FIG. 7 shows a perspective view of fixture 100 and FIGS. 8-14 show various cross-sectional views of fixture 100. Clamping members 222, 224 are movable to apply force F by an actuator 220. Clamping members 222, 224 may together in a closed position, shown in the cross-sectional view of FIG. 9, apply force F to position superalloy turbine blade 102 in elastically deformed position 124D. That is, an interior surface 226 of one or both clamping members 222, 224 may have a shape, alone or collectively, that elastically deforms superalloy turbine blade 102, e.g., by providing surfaces that deform the blade in certain locations and/or pockets that allow the blade to move therein to deform. In operation, superalloy turbine blade 102 in relaxed, initial position 124R is placed within clamping members 222, 224 in an open position thereof, as shown in FIG. 8. Actuator 220 then forces clamping members 222, 224 to a closed position as shown in FIG. 9 to apply force F and elastically deform the blade into elastically deformed position 124D. As shown in FIG. 9, in elastically deformed position 124D, drill guide 140 may guide drilling element 142 of STEM system 144 to drill hole 146 into the blade.

Figure 10:
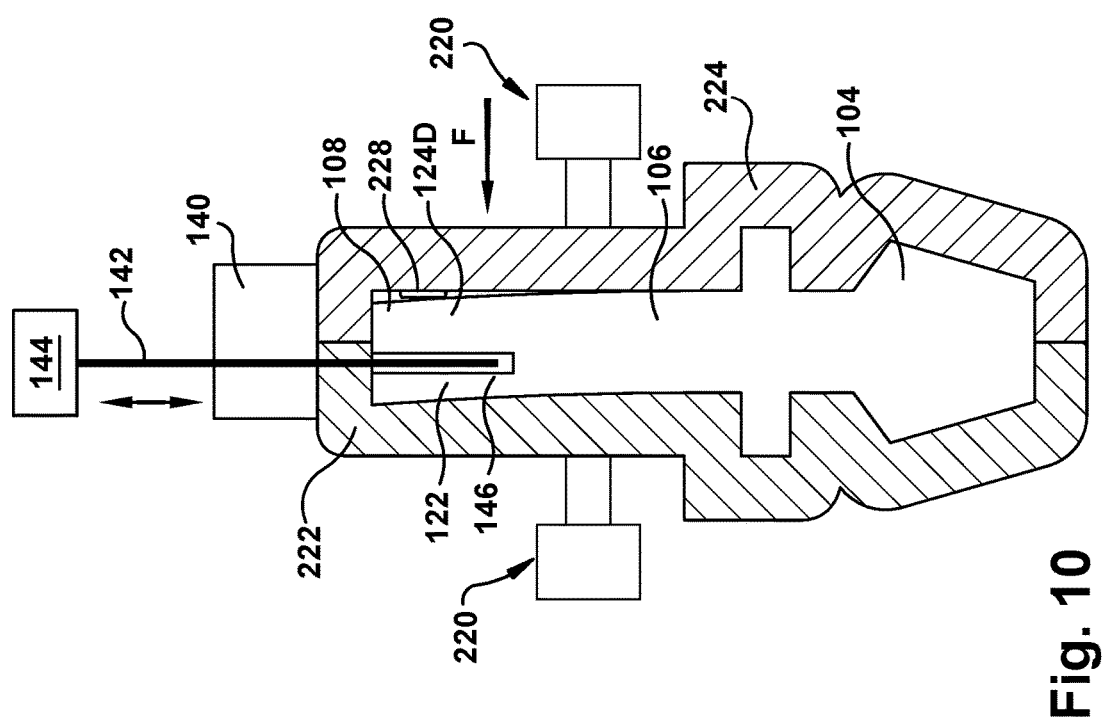
FIG. 10 shows a side view of a pair of clamping members of the fixture of FIG. 7 in a closed position according to an alternative embodiment.

In another embodiment, as shown in the cross-sectional view of FIG. 10, rather than having complex surfaces 226 that create the elastic deformation, clamping members 222, 224 may generally mimic the blade exterior but be slightly larger. In this case, at least one of clamping member 222, 224 may include an element 228 configured to apply force F to elastically deform at least portion 122 of superalloy turbine blade 102. Otherwise, clamping members 222, 224 may generally mimic an exterior surface of superalloy turbine blade 102. Element 228 may be, for example, a bump or ridge on surface 226. Actuator 220 may include any of the afore-described mechanisms in FIGS. 1, 2, 4-6, to apply force to one (FIG. 9) or both (FIG. 10) clamping members 222, 224 about superalloy turbine blade 102.

Figure 12:
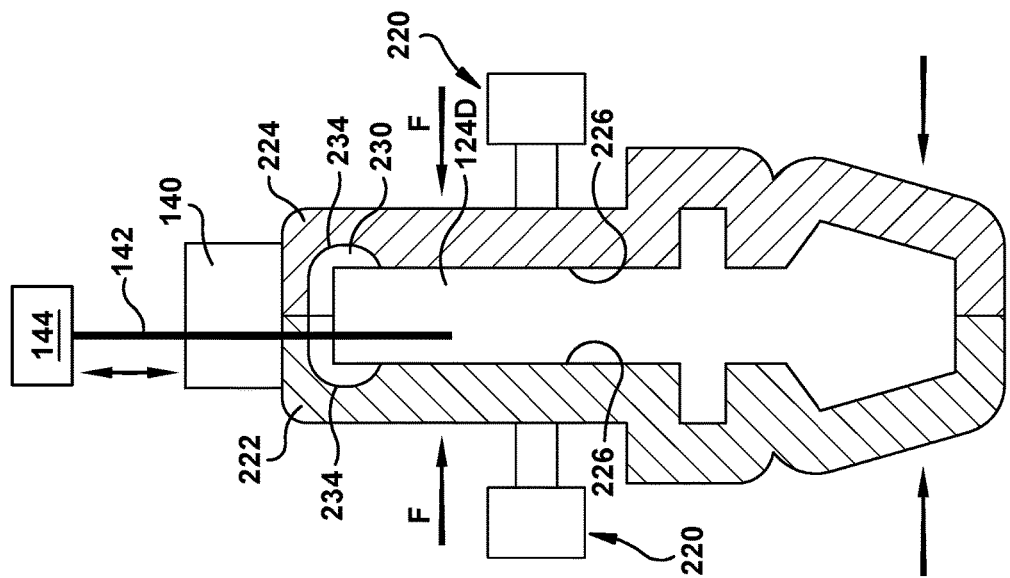
FIGS. 11 and 12 show side views of a pair of clamping members of the fixture of FIG. 7 in an open and a closed position, respectively, according to another embodiment of the disclosure.
Figure 11:
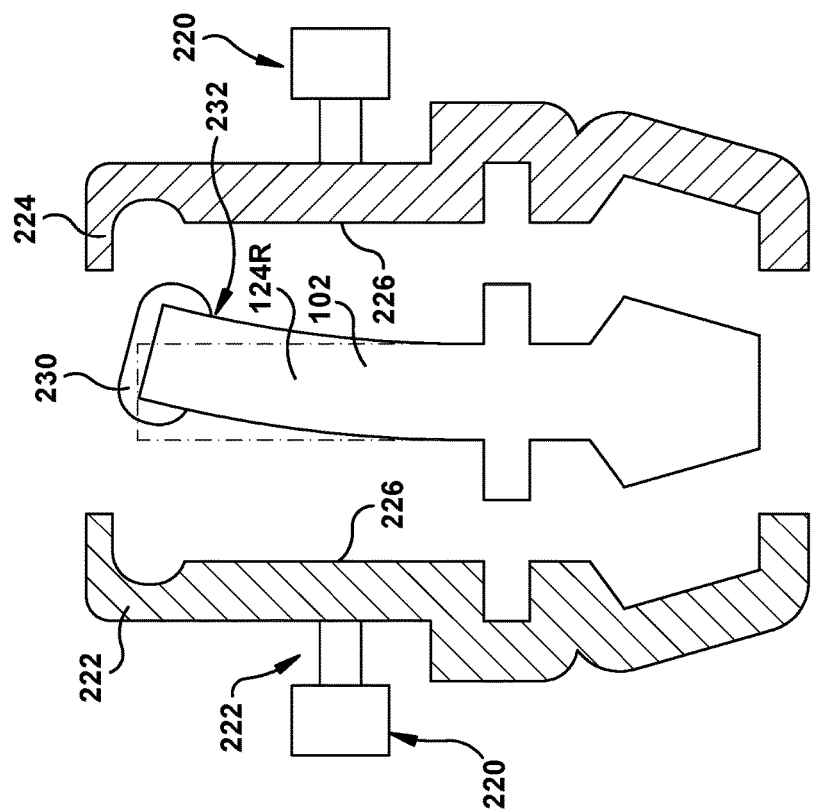

Referring to the cross-sectional views of FIGS. 11 and 12, in another embodiment, a protective member 230 for coupling at a location 232 on superalloy turbine blade 102 may be provided for use with clamping members 222, 224. In this case, at least one of the clamping members 222, 224 (shown as both) include a recess 234 to accommodate protective member 230. Clamping member(s) 222, 224 may include interior surface 226 to apply force to protective member 230 or another location of the blade. Protective member 230 may include any material capable of withstanding force F and protecting superalloy turbine blade 102, e.g., a strong metal alloy, steel or steel alloy. Protective member 130 may not be necessary in all instances.

With further regard to the FIGS. 7-12 embodiments, while clamping members 222, 224 are shown encompassing all of superalloy turbine blade 102, it is recognized that clamping members 222, 224 may encompass only that section of the blade necessary to create the desired elastically deformed position 124D, e.g., only airfoil 106 or a part thereof.

Figure 13:
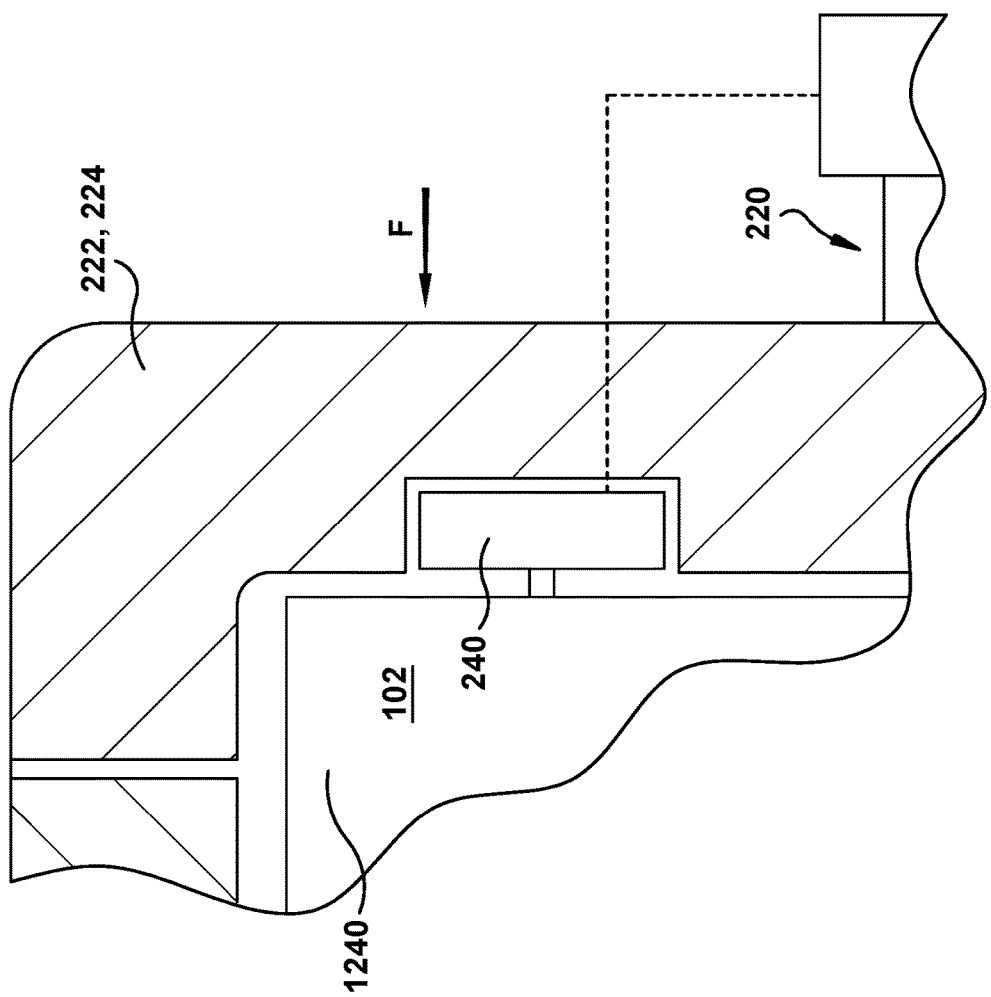
FIG. 13 shows a side view of a sensor for the fixture of FIG. 7 according to an embodiment of the disclosure.

FIG. 13 shows an enlarged cross-sectional view of another optional embodiment of clamping members 222, 224. In this embodiment, a sensor 240 is operatively coupled to at least one of clamping members 222, 224 to identify that superalloy turbine blade 102 is in elastically deformed position 124D. Sensor 240 may include any form of electronic sensor capable of positional triggering, e.g., a touch sensor, laser sensor, button sensor, etc. Sensor 240 may indicate proper positioning in any known fashion, e.g., visible or audible indicator, or an electric signal to a control system of, for example, STEM system 144 (not shown) or actuator 220. In operation, superalloy turbine blade 102 would be elastically deformed using actuator 220 until sensor 240 indicated it was in elastically deformed position 124D.

FIG. 14 shows a partial cross-sectional view and FIG. 15 shows a schematic perspective view of a seal 250 for use with clamping members 222, 224. As understood, STEM system 144 disperses a liquid electrolyte as part of the process of drilling hole 146. In order to prevent electrolyte from spilling and/or not being recycled in a conventional fashion, seal 250 may be provided, as shown in the cross-sectional view of FIG. 14, in at least one of the pair of clamping members 222, 224 for sealing with a surface 252 of superalloy turbine blade 102. FIG. 15 illustrates how seal 250 may extend around an entirety of the blade to prevent liquid electrolyte from passing radially inward along the blade. Here, at least one of the pair of clamping members 222, 224 may include a drain hole 254 therethrough, i.e., for allowing controlled draining of liquid electrolyte therefrom. Drain hole 254 could also be fluidly coupled to any now known or later developed form of liquid electrolyte recycling system (not shown) of STEM system 144 (FIG. 7).

In operation, superalloy turbine blade 102 is mounted in any one of the afore-described fixtures 100. Force F is then applied by fixture 100 to elastically deform at least portion 122 of the blade from relaxed, initial position 124R (FIG. 3) to elastically deformed position 124D (FIG. 3). For example, force F may be applied by applying a pair of clamping members 222, 224 (FIGS. 9-12) to superalloy turbine blade 102. As noted, at least one of clamping members 222, 224 may include element 228 (FIG. 10) configured to apply force F. In this setting, as shown in FIGS. 11 and 12, protective member 230 may be attached at location 232 on superalloy turbine blade 102, and at least one of clamping members 22, 224 may include recess 234 to accommodate the protective member. Further, one can ensure superalloy turbine blade 102 is in elastically deformed position 124D prior to the hole drilling by, for example, measuring an amount of deformation using any now known or later developed solution, or sensing a position of the at least a portion of the superalloy turbine blade, e.g., using a sensor 240, as shown in FIG. 13, to sense whether elastically deformed position 124D has been achieved by applying the pair of clamping members 222, 224. Further, as shown in FIGS. 14 and 15, seal 250 may be formed, e.g., mounted or applied, between pair of clamping members 222, 224 and surface 252 of superalloy turbine blade 102, and at least one of clamping members 222, 224 may include drain hole 254 therethrough to allow liquid electrolyte to drain or be recycled therefrom. In another example, the force may be applied by, as shown in FIGS. 1 and 2, holding first end (root end 104) of superalloy turbine blade 102 in fixture 100, and applying force F to a second, opposing end (tip end 108) of the blade. Protective member 130 may be applied to portion 122 of superalloy turbine blade 102, and force F applied to the protective member. In one option, force F, as shown in FIG. 6, may be applied as a turning force to at least portion 122 of the blade.

Figure 16:
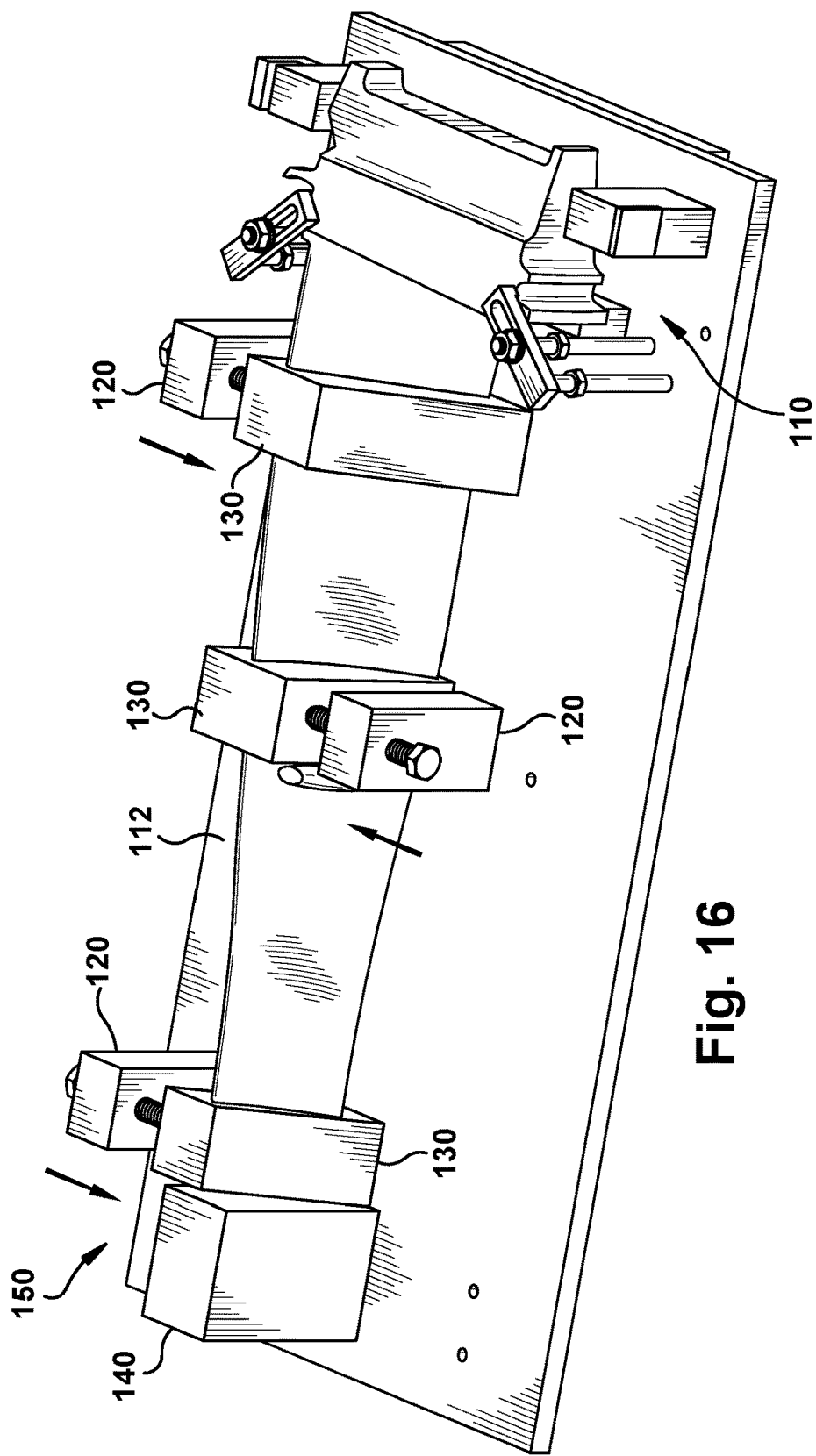
FIG. 16 shows a side view of applying a force at a number of location of a superalloy turbine blade according to embodiments of the disclosure.

As noted, force F is substantially similar to a force applied to superalloy turbine blade 102 during operation of the superalloy turbine blade in a turbomachine, i.e., it does not permanently deform it. As shown in FIG. 3, elastically deformed position 124D may include: lateral deformation LD perpendicular to longitudinal axis A of superalloy turbine blade 102 and/or a twist R about longitudinal axis A of superalloy turbine blade 102. In any event, at least portion 122 of superalloy turbine blade 102 has a curvature (See FIG. 3) in elastically deformed position 124D (FIG. 3) not present in relaxed, initial position 124R (FIG. 3). Certain fixtures and actuators may apply force F in a distributed manner along at least portion 122 of superalloy turbine blade 102. For example, fixture 100 including clamping members 222, 224 may apply a distributed force F, as shown in FIG. 9. Actuators 120, as shown in FIGS. 1 and 2, could also be duplicated at select locations along the blade to provide a distributed force. For example, FIG. 16 shows a schematic view in which three actuators 120, similar to that shown in FIG. 1, are located at a number of locations along at least portion 122 of superalloy turbine blade 102 to apply a force F. In this example, actuators 120 may straighten the blade.

Regardless of how elastically deformed, as shown for example in FIG. 2, a hole 146 may be drilled generally span-wise through at least portion 122 of superalloy turbine blade 102 in elastically deformed position 124D. As noted, the hole drilling may include STEM, and may include drilling a straight hole, as shown in FIG. 2, or at a constant radius curvature (CCR), as shown in FIG. 9. While one hole 146 has been illustrated, it is emphasized that any number of holes 146 may be drilled either alone or simultaneously.

Figure 17:
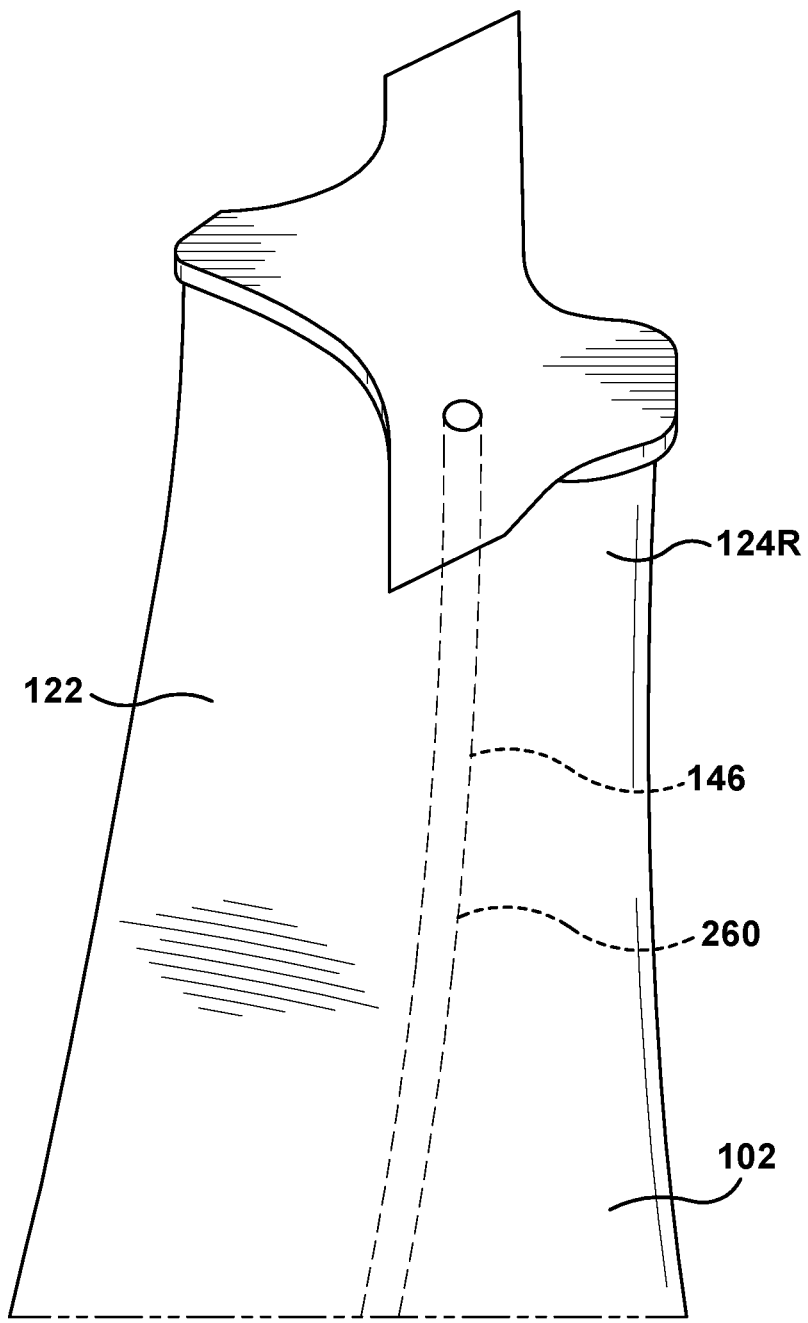
FIG. 17 shows a side view of a superalloy turbine blade including a hole for a cooling passage therein formed according to embodiments of the disclosure.

As shown in FIG. 17, force F is released after the drilling, allowing superalloy turbine blade 102 to return to relaxed, initial position 124R and hole 146 to take on a hole curvature within at least portion 122 of the blade. Hole 146 can be plugged or interconnected to other passages in any known fashion to create a cooling passage 260 in the blade. As shown in FIG. 17, hole 146 curvature may vary along at least portion 122 of the blade.

As described herein, embodiments of the disclosure provide methods and fixtures for elastically deforming superalloy turbine blades while also making them compatible for STEM drilling methods. Consequently, teachings of the disclosure provide for fabrication of long variable curvature cooling passages in large, late stage superalloy turbine blades, providing effective cooling for these blades.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A method, comprising:
applying a force to elastically deform at least a portion of a superalloy turbine blade from a relaxed, initial position to an elastically deformed position, the at least a portion of the superalloy turbine blade having a curvature in the elastically deformed position not present in the relaxed, initial position;
drilling a hole generally span-wise through the at least a portion of the superalloy turbine blade in the elastically deformed position; and
releasing the force, allowing the superalloy turbine blade to return to the relaxed, initial position and the hole to take on a hole curvature within the at least a portion of the superalloy turbine blade.

2. The method of claim 1, wherein the hole drilling includes shaped tube electrolytic machining (STEM).

3. The method of claim 1, wherein the hole drilling includes drilling at a constant radius curvature.

4. The method of claim 1, wherein the hole drilling includes drilling along a linear path.

5. The method of claim 1, wherein the hole curvature varies along the at least a portion of the superalloy turbine blade.

6. The method of claim 1, wherein the applying the force includes applying the force in a distributed manner along the at least a portion of the superalloy turbine blade.

7. The method of claim 1, wherein the applying the force includes applying the force at a number of locations along the at least a portion of the superalloy turbine blade.

8. The method of claim 1, further comprising ensuring the superalloy turbine blade is in the elastically deformed position prior to the hole drilling by one of measuring an amount of deformation or sensing a position of the at least a portion of the superalloy turbine blade.

9. The method of claim 1, wherein the applying the force includes:
applying a pair of clamping members to the superalloy turbine blade, at least one of the clamping members including an element configured to apply the force to elastically deform the at least a portion of the superalloy turbine blade during the applying.

10. The method of claim 9, further comprising attaching a protective member at a location on the superalloy turbine blade, at least one of the clamping members including a recess to accommodate the protective member.

11. The method of claim 9, further comprising sensing whether the elastically deformed position has been achieved by the applying the pair of clamping members.

12. The method of claim 9, further comprising forming a seal between the pair of clamping members and a surface of the superalloy turbine blade, wherein at least one of the clamping members includes a drain hole therethrough.

13. The method of claim 1, wherein the applying the force includes:
holding a first end of the superalloy turbine blade in a fixture; and
applying the force to a second, opposing end of the superalloy turbine blade.

14. The method of claim 1, further comprising coupling a protective member to a portion of the superalloy turbine blade, and wherein the force applying includes applying the force to the protective member.

15. The method of claim 1, wherein the force is substantially similar to a force applied to the superalloy turbine blade during operation of the superalloy turbine blade in a turbomachine.

16. The method of claim 1, wherein the elastically deformed position includes at least one lateral deformation perpendicular to a longitudinal axis of the superalloy turbine blade and a twist about the longitudinal axis of the superalloy turbine blade.

17. The method of claim 1, wherein the applying the force includes applying a turning force to the at least a portion of the superalloy turbine blade.

18. A method, comprising:
coupling a protective member to a first portion of a superalloy turbine blade;
applying a force to the protective member to elastically deform at least a second portion of a superalloy turbine blade from a relaxed, initial position to an elastically deformed position, the at least a second portion of the superalloy turbine blade having a curvature in the elastically deformed position not present in the relaxed, initial position;
drilling a hole, using shaped tube electrolytic machining (STEM), generally span-wise through the at least a second portion of the superalloy turbine blade in the elastically deformed position; and
releasing the force, allowing the superalloy turbine blade to return to the relaxed, initial position and the hole to take on a hole curvature within the at least a portion of the superalloy turbine blade.

19. The method of claim 18, wherein the applying the force includes:
holding a first end of the superalloy turbine blade in a fixture; and
applying the force to the protective member at a second, opposing end of the superalloy turbine blade.

20. The method of claim 18, wherein the applying the force includes applying a turning force to the at least a portion of the superalloy turbine blade.

* * * * *